Figure 1:
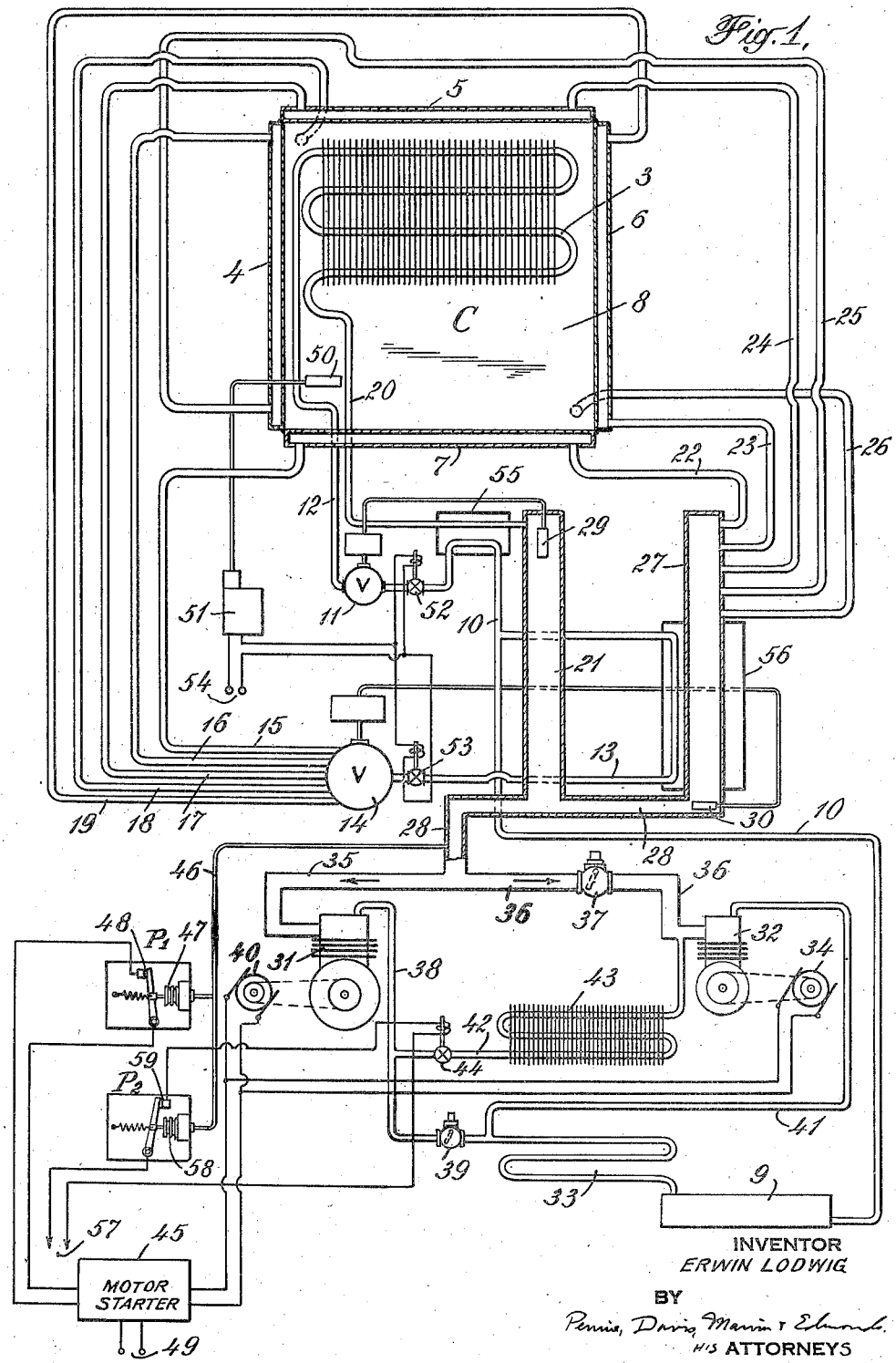

May 4, 1943. E. LODWIG 2,318,318
REFRIGERATION
Filed May 23, 1942 2 Sheets-Sheet 2

INVENTOR
ERWIN LODWIG
BY
Pennie, Davis, Marvin & Edmonds.
HIS ATTORNEYS

Patented May 4, 1943

2,318,318

UNITED STATES PATENT OFFICE 2,318,318

REFRIGERATION

Erwin Lodwig, Franklin Square, N. Y., assignor to Mobile Refrigeration, Inc., New York, N. Y., a corporation of New York Application May 23, 1942, Serial No. 444,229

12 Claims. (Cl. 62—115)

This invention relates to refrigeration and more particularly concerns an improved refrigerating system for use in rapidly lowering the temperature of the air in a chamber or other space to be refrigerated.

In certain testing and development operations it is necessary to simulate the rapidly varying conditions of temperature and pressure encountered by aircraft in flight. I have devised an improved refrigerated pressure chamber for this purpose, and the present invention relates to improved refrigeration equipment for rapidly and economically lowering the temperature of the air in such a chamber. The extreme ranges of temperature variation encountered in flight and the rapidity with which these changes take place necessitate the use of refrigerating equipment of considerable capacity in order to produce the conditions necessary for testing equipment used in flight. Chambers for use in the described operation must be of considerable mass in order to withstand the wide variations in chamber air pressure used to simulate flight conditions, and the mass of the chamber may considerably increase the heat load imposed on the refrigerating equipment. In testing or development work of this nature, the air within the chamber must frequently be cooled rapidly through temperature ranges of the order of 200° F. or more.

It is the object of the present invention to provide an improved refrigerating system for rapidly and efficiently lowering the temperature of the air or other gas in a closed compartment or chamber. The system is also applicable to the cooling of other fluids or objects. In general, the refrigerating system of the invention is of the compression type and includes a plurality of compressors, and means are provided for altering the connection of the compressors under the control of the pressure difference through which they compress the refrigerant gas in such fashion as to provide parallel operation of the compressors when the pressure difference is low and series or compound operation thereof when the pressure difference is high. This arrangement combines high displacement of refrigerant gas by the compressors and consequent rapid decrease in the chamber temperature over the higher temperature range, and high volumetric efficiency of the compressors over the lower temperature range of operation.

Other objects, features, and advantages of the invention will be apparent from the following description of certain typical embodiments thereof. In describing the invention in detail, reference will be made to the accompanying drawings, in which Fig. 1 is a diagrammatic and simplified representation of a refrigerating system embodying the invention and connected to cool a closed test chamber; and Fig. 2 is a similar representation of a modified form of refrigerating system embodying the invention.

Figure 2:
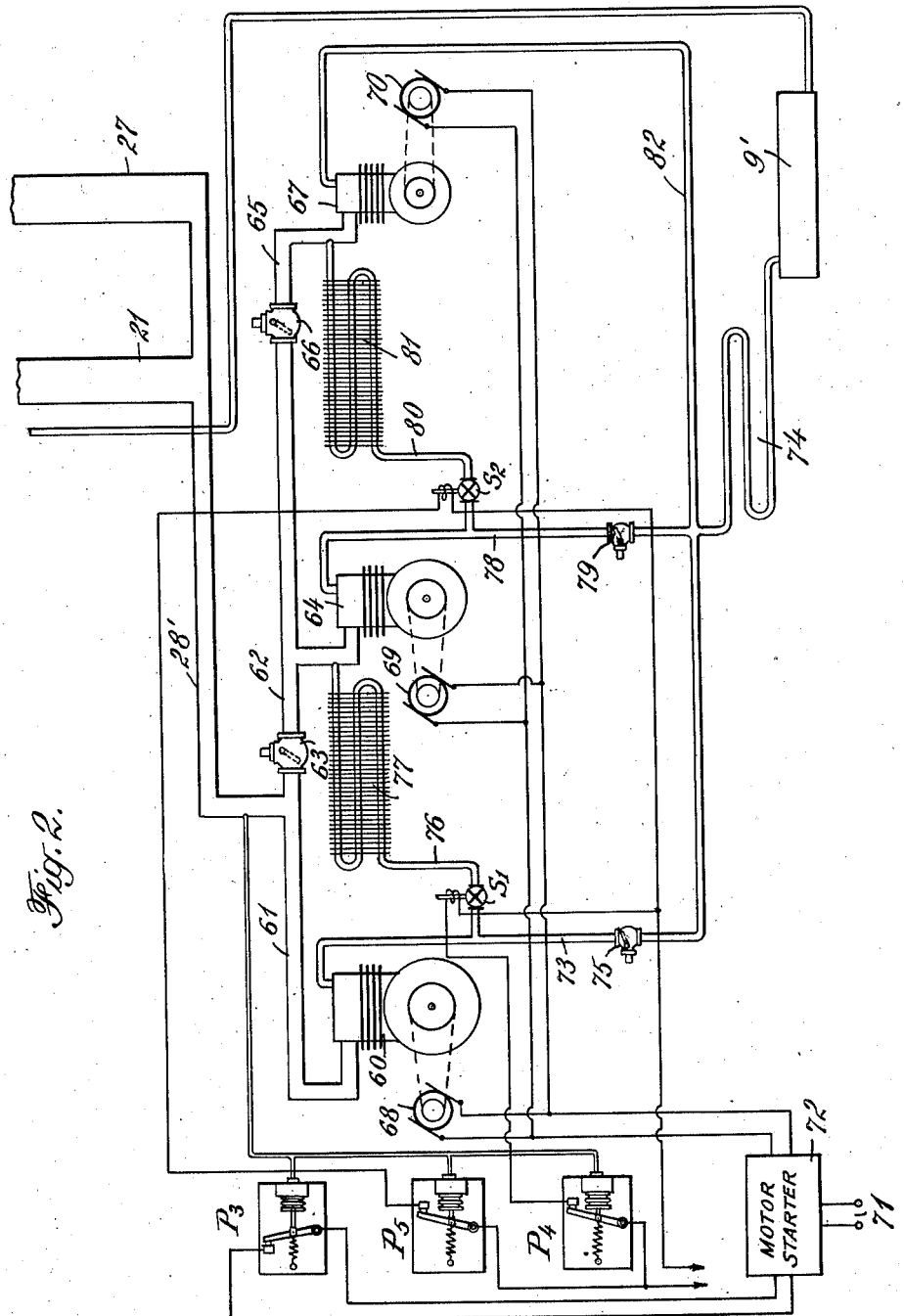

Referring to Fig. 1, I have represented at C a chamber for use in testing or developing aircraft instruments or devices under varying conditions of pressure and temperature, such conditions including rapid drops in temperature over considerable ranges. The chamber is closed during operation and the temperature of the air therein is lowered by suitable cooling units or evaporators. In the illustrated embodiment, an evaporator coil 3 is provided within the chamber, and in addition the chamber walls, five of which are shown, act as evaporators or cooling units. This may be accomplished by employing hollow walls as shown at 4, 5, 6 and 7, and expanding refrigerant within these walls and within a similar hollow rear wall 8. The use of the chamber walls as evaporators insures that heat will be rapidly removed from the chamber wall structure at the same time that the chamber air is being cooled by the evaporator coil 3. Since chambers of the nature illustrated must be substantially completely evacuated during operation, the chamber walls are necessarily somewhat massive and the rapid cooling of the walls is necessary if the chamber air temperature is to be rapidly reduced. It will be understood that the chamber walls may be insulated from the surrounding atmosphere by any suitable known means.

The refrigerant expanded in the evaporator comprising the coil 3 and the hollow chamber walls 4, 5, 6, 7 and 8 is supplied by a compression type refrigerating system. The system includes a receiver 9 from which liquid refrigerant is fed through a duct 10, a solenoid valve 52, an expansion valve 11, and a refrigerant feed duct 12 to the evaporator coil 3, and through ducts 10 and 13, a solenoid valve 53, an expansion valve 14 and feed ducts 15, 16, 17, 18 and 19 to the chamber wall evaporators 7, 4, 5, 8 and 6, respectively. The refrigerant return duct 20 from the expansion coil 3 enters a manifold 21, and the return ducts 22, 23, 24, 25 and 26 from the several chamber wall evaporators communicate with a return manifold 27. The two manifolds 21 and 27 are connected as shown to a common suction line 28.

The flow of refrigerant to the evaporator coil 3 is thermostatically controlled in accordance with changes in the temperature of the expanded refrigerant returning from the coil to the manifold 21. The operation of the expansion valve 11 is governed by a temperature responsive bulb or element 29 in the manifold 21 in such fashion as to increase the feed of refrigerant to the coil when the temperature of the returned refrigerant rises above a predetermined value, and to reduce the refrigerant feed when the returned refrigerant temperature falls below a predetermined value. The expansion valve 14 similarly controls the flow of refrigerant to the chamber wall evaporators 4, 5, 6, 7 and 8 and is similarly thermostatically controlled in accordance with changes in the temperature of the expanded refrigerant in the manifold 27 by the bulb or element 30. Since thermostatically controlled expansion valves of this nature are well known in the art, a detailed description of the valves 11 and 14 and their control elements 29 and 30 will be omitted to simplify the disclosure.

Referring now to the compressing and condensing unit which withdraws expanded refrigerant from the suction line 28 and supplies liquid refrigerant to the receiver 9, this includes at least two compressors 31 and 32 and a condenser 33. Various forms of compressors may be used, and in the embodiment of Fig. 1, two reciprocating compressors are shown. The compressor 31 preferably has a larger volumetric capacity than the compressor 32. It should be understood that single or double acting compressors of single or multiple cylinder construction may be used. The compressors 31 and 32 are driven by individual electric motors 40 and 34, respectively, but a single motor or other prime mover may be used to drive both compressors if desired.

The suction line 28 is connected to the intake of the compressor 31 through a duct 35 and to the intake of the compressor 32 through a duct 36 having a check valve 37 therein. The valve 37 permits the flow of refrigerant from the suction line 28 to the compressor 32, but prevents return flow of refrigerant from the compressor 32 to the line 28 or to the intake of the compressor 31. The discharge of the compressor 31 is connected through the duct 38 and a check valve 39 to the refrigerant condenser 33. The check valve 39 permits refrigerant flow toward the condenser 33 and prevents return flow from the condenser to the discharge of the compressor 31 through the duct 38. The discharge of the compressor 32 is connected to the inlet of the condenser 33 through the duct 41. A by-pass duct 42 including an inter-cooler 43 of known construction is connected between the discharge of the compressor 31 and the inlet of the compressor 32. A solenoid valve 44 is provided in the by-pass duct 42 and is arranged to open when its solenoid is energized and to close when its solenoid is de-energized.

The compressor 31 may be cooled by any suitable medium such as air or water. The condenser 33 is designed with excess heat absorbing capacity so that the condensing pressure of the refrigerant is substantially constant under all loads within the capacity of the system. With this arrangement, the compressors 31 and 32 compress the refrigerant against a substantially constant maximum condensing pressure, and the range through which the refrigerant is compressed varies with the evaporated refrigerant pressure in the suction line 28.

The flow of refrigerant to the evaporator coil 3 and to the chamber wall evaporators 4, 5, 6, 7 and 8 is thermostatically controlled in accordance with the temperature of the air in the chamber C by conventional control means. As shown, a temperature responsive bulb or element 50 is provided in the chamber C. When the temperature of the air in the chamber C rises above a predetermined value (which is preferably adjustable) the element C closes a control switch 51 of known construction, and this switch when so closed energizes and opens the solenoid valves 52 and 53 in the refrigerant feed lines to the evaporator coil 3 and the chamber wall evaporators, respectively. Energy for the solenoid valves 52 and 53 is supplied from any suitable source, indicated at 54. When the chamber air temperature is reduced to the required value, the temperature responsive element 50 causes the switch 51 to open and so de-energizes and closes the solenoid valves 52 and 53, cutting off further supply of refrigerant to the evaporators.

If desired, heat economies may be effected by heat exchange between the refrigerant supply line 10 and the return line 20 and between the supply line 13 and the return manifold 27. Heat exchanging means for this purpose is conventionally illustrated at 55 and 56.

The compressor motors 40 and 34 are electrically connected in parallel as shown and are energized to operate the compressors by a motor starter 45 under control of the suction line pressure. To this end, a pressure operated switch P₁ is connected through a pipe 46 to the suction line 28 and acts through an expansible bellows 47 to close its contacts 48 when the suction line pressure rises above a predetermined value. Closure of the contacts 48 energizes the motor starter 45 which then acts in a known manner to energize the compressor drive motors 40 and 34 from a suitable source of energy connected to the leads 49. When the refrigerant pressure in the suction line 28 falls below a predetermined value, the contacts 48 of the device P₁ open and the compressor motors are de-energized by the motor starter 45.

The solenoid valve 44 in the by-pass duct 42 is controlled by a pressure operated switch P₂. The bellows 58 of this switch is connected to the suction line 28. The arrangement is such that when the refrigerant pressure in the suction line falls below a predetermined value, the bellows 58 closes the contacts 59 of the switch P₂, energizing and so opening the solenoid valve 44 through a circuit that includes a suitable source of energy connected at 57. When the pressure of the refrigerant in the suction line rises above the predetermined value, the bellows 58 opens the contacts 59 and the solenoid valve 44 is de-energized and closed.

In the operation of the system of Fig. 1, when the chamber air temperature rises above the value for which the control switch 51 is set, this switch energizes and so opens the solenoid valves 52 and 53, admitting the refrigerant from the receiver 9 to the evaporators 3, 4, 5, 6, 7 and 8 under control of the expansion valves 11 and 14. The valves 11 and 14 control the flow of refrigerant to the several evaporators as required. The refrigerant expands in the evaporators and returns through the manifolds 21 and 27 to the common suction line 28, raising the pressure in this line. At the start of the operation, the suction line pressure is very low, say four inches of mercury absolute, but the evaporating refrigerant rapidly increases this pressure. When the suction line pressure has increased to a predetermined value, say six inches of mercury absolute, the switch P₁ closes its contacts 48 and the motors 40 and 34 are energized, starting operation of the compressors 31 and 32. At this low suction line pressure, the contacts 59 of the switch P₂ are closed and the solenoid valve 44 is accordingly open. Assuming a considerable heat load on the chamber, such as is encountered in cooling the chamber from room temperature or above, the suction line pressure rises very rapidly and at a predetermined higher value, say twenty inches of mercury absolute, the switch P₂ opens its contact 59, de-energizing and so closing the solenoid valve 44 in the by-pass duct 42. The compressors then operate in parallel, the compressor 31 drawing refrigerant from the line 28 through the duct 35 and delivering compressed refrigerant through the duct 38 to the condenser 33. The compressor 32 draws refrigerant from the line 28 through the duct 36 and discharges refrigerant through the duct 41 to the condenser 33. This parallel operation of the condensers delivers a large volume of refrigerant, compressed over a relatively low range, to the condenser 33, and so rapidly replenishes the liquefied refrigerant being withdrawn from the receiver 9 to the evaporators.

The evaporation of refrigerant in the evaporators rapidly lowers the temperature of the chamber walls and the air within the chamber and as the temperature falls, the refrigerant pressure in the suction line 28 is reduced. The drop in suction line pressure with constant condensing pressure in condenser 33 increases the pressure range over which the compressors operate. As this compression range increases the volumetric efficiency of the compressors is reduced. When the suction line pressure has fallen to a predetermined low value, such that a material reduction in suction stroke charge and hence a material reduction in the volumetric efficiency of the compressors has occurred, the switch P₂ closes its contacts 59 and energizes and so opens the solenoid valve 44. The suction line pressure at which the switch P₂ closes its contacts may be, for example, about eighteen inches of mercury absolute. Opening of the solenoid valve 44 connects the compressors 31 and 32 in series or compound relation. The larger compressor 31 draws refrigerant from the suction line 28 through the duct 35, compresses this refrigerant through a portion of the compression range and delivers it through the duct 38 and the by-pass duct 42 and inter-cooler 43 to the intake of the compressor 32. The consequent rise in pressure at the intake of the compressor 32 closes the check valve 37. The compressor 32 receives refrigerant from the by-pass duct 42 and compresses it to the condensing pressure, delivering the compressed refrigerant through the duct 41 to the condenser 33. The increased pressure at the condenser inlet closes the check valve 39.

The change to compound or series connection of the compressors reduces the pressure range through which each compressor operates, and so increases the volumetric efficiency of the compressors. This enables the system to produce very low temperatures in the chamber without either employing excess refrigerating capacity or reducing the rate at which the chamber temperature is lowered over the higher temperature ranges. In other words, with the system of the present invention, the compressors act in parallel and so compress large volumes of refrigerant over a relatively low pressure range when the chamber temperatures are relatively high, whereas the compressors are connected in series and compress smaller volumes of refrigerant over a higher compression range when the temperature of the chamber is low. The connection of the compressors in parallel or in series is automatically governed by the compression range through which they operate, as determined by the pressure in the common suction line connected to the evaporators.

When the chamber temperature is reduced to the desired value, the control switch 51 de-energizes and so closes solenoid valves 52 and 53. This cuts off further flow of refrigerant to the evaporators, and as soon as the refrigerant remaining therein has evaporated, the compressors reduce the suction line and evaporator pressure to a minimum value, say about four inches of mercury absolute, whereupon the control switch P₁ opens its contacts 48 and the compressor motors 40 and 34 are de-energized, thus completing the operating cycle.

Any desired number of compressors may be used in my improved system. In Fig. 2 I have illustrated an embodiment in which three compressors are used. The common suction line connected to the evaporating means is shown at 28' and it is connected to the intake of a compressor 60 of large displacement through a duct 61. A duct 62 with a check valve 63 therein connects the suction line with the intake as a compressor 64 of intermediate displacement, and a duct 65 with a check valve 66 therein connects the duct 62 with the intake of a third compressor 67 of relatively small displacement. As in the embodiment of Fig. 1, each of the compressors 60, 64 and 67 may be operated by a motor 68, 69 and 70, and the motors are shown arranged to be energized in parallel from a suitable source 71 by a motor starter 72 under control of a switch P₃, operated by the suction line pressure. The compressor 60 discharges through a duct 73 to the inlet of the condenser 74 and a check valve 75 prevents return flow through the duct 73. A by-pass pipe 76 including an inter-cooler 77 connects the discharge of the compressor 60 to the inlet of the compressor 64, and a solenoid valve S₁ controls this by-pass. The valve S₁ is opened when energized and is controlled by a switch P₄ in accordance with the suction line pressure.

The discharge of the intermediate compressor 64 is connected to the condenser inlet through a duct 78 having a check valve 79 therein. A by-pass duct 80 including an inter-cooler 81 connects the discharge of the compressor 64 with the inlet of the compressor 67. A solenoid valve S₂ is provided in the duct 80 and is controlled by a pressure operated switch P₅ responsive to the pressure in the suction line 28'. The discharge of the compressor 67 is connected to the condenser 74 through a duct 82. As in the embodiment of Fig. 1, the condenser 74 has sufficient cooling capacity so that it operates at substantially constant condensing pressure. A receiver 9' receives liquid refrigerant from the condenser 74. The liquid refrigerant may be delivered to any suitable evaporator or evaporators such as those employed to cool a chamber, as disclosed above in connection with Fig. 1.

The three compressors of the system of Fig. 2 operate in parallel under lower ratios of suction line pressure to condenser pressure. When this pressure ratio increases above a predetermined value, the first compressor 60 is connected in series with the intermediate and final compressors 64 and 67 in parallel. When the compression range between the suction line and the condenser reaches a higher predetermined value, the three compressors are connected in series.

When the compressors are started by closure of the pressure operated switch P3 in response to a rise in suction line pressure from the minimum value, the suction line pressure rises rapidly, as explained above in connection with the embodiment of Fig. 1, and when this pressure reaches a value of say twenty inches of mercury absolute, the switches P4 and P5 are both opened and hence the solenoid valves S1 and S2 are both de-energized and closed. The compressors 60, 64 and 67 then operate in parallel and compress the expanded refrigerant at high volume through a relatively low pressure range. As the suction line pressure is reduced, a point is reached where the volumetric efficiency of the compressors falls off, and the pressure operated switch P4 closes, energizing and so opening the solenoid valve S1. This may occur, for example, at a suction line pressure of about eighteen inches of mercury absolute. When the solenoid valve S1 opens, the compressor 60 discharges through the by-pass duct 76 and the inter-cooler 77 to the inlet of the compressors 64 and 67 which are connected in parallel by the ducts 62 and 65. The rise in pressure in the duct 62 closes the check valve 63 and the rise in condenser pressure over the discharge pressure of the compressor 60 closes the check valve 75. The compressor 60 now acts as a first compression stage, compressing the refrigerant over a reduced pressure range, and the compressors 64 and 67 act in parallel as a second compression stage, compressing the refrigerant over the remainder of the compression range. The result is that the volumetric efficiency of the compressors is increased by the reduction in the ranges through which they operate.

As the suction line pressure continues to drop, the volumetric efficiency of the compressors again falls, and at a predetermined low suction line pressure, say about thirteen inches of mercury absolute, the switch P5 closes and so energizes and opens the solenoid valve S2. This connects the compressors 64 and 67 in series, the refrigerant discharged from the compressor 64 passing through the by-pass duct 80 and inter-cooler 81 to the inlet of the compressor 67. The increase in pressure at the inlet of the compressor 67 closes the check valve 66, and the drop in discharge pressure of the compressor 64 relative to the condenser pressure closes the check valve 79. The three compressors 60, 64 and 67 then act as first, second, and third compression stages, respectively, and since the pressure range through which each compressor operates is reduced, the volumetric efficiency of each is increased.

It should be noted that in both of the illustrated embodiments of the invention, the connection of the compressors is determined by the ratio of suction line pressure to condenser pressure. Thus, if the compression unit starts operating when the temperature of the refrigerated space is relatively low and the suction line pressure accordingly remains relatively low, the compressors will operate in series or in series parallel relation. In any case, the connection of the compressors is automatically adjusted in accordance with the suction line or evaporator pressure for maximum volumetric efficiency.

Although in the disclosed embodiment the improved compression and condensing unit has been disclosed as connected to supply refrigerant to the evaporators of a test chamber, it should be understood that the invention is not limited to such application and that the improved unit may be used to advantage wherever rapid and efficient compression and condensing of refrigerant is required. It should also be understood that the pressures at which the various control devices operate have been recited herein by way of example only, and that the invention is in no sense limited to the particular values noted.

I claim:

1. In a refrigerating system, in combination with a refrigerant evaporator, a refrigerant condenser and means for conducting condensed refrigerant from said condenser to said evaporator, at least two compressors connected in parallel between said evaporator and said condenser, and means responsive to a predetermined increase in the difference in pressure between the refrigerant in said evaporator and the refrigerant in said condenser for connecting said compressors in series between said evaporator and said condenser.

2. In a refrigerating system, in combination with a refrigerant evaporator, a refrigerant condenser and means for conducting condensed refrigerant from said condenser to said evaporator, at least two compressors for compressing refrigerant withdrawn from said evaporator and delivering compressed refrigerant to said condenser, and means responsive to the pressure of the refrigerant withdrawn from said evaporator for connecting said compressors in parallel when said pressure is above a predetermined value and for connecting said compressors in series when said pressure is below said value.

3. In a refrigerating system, in combination with a refrigerant evaporator, a refrigerant condenser and means for conducting condensed refrigerant from said condenser to said evaporator, a compression unit comprising a plurality of compressors for withdrawing evaporated refrigerant from said evaporator, compressing the refrigerant to a substantially constant condensing pressure and delivering such refrigerant to said condenser, and means responsive to changes in the evaporator pressure for connecting said compressors in parallel when said evaporator pressure is above a predetermined value and connecting said compressors in series when said evaporator pressure is below a predetermined value.

4. In a refrigerating system, in combination with a refrigerant evaporator, a refrigerant condenser and means for conducting refrigerant from said condenser to said evaporator, a compression unit comprising at least two compressors each having an intake and a discharge, a suction line for withdrawing evaporated refrigerant from said evaporator, ducts connecting said suction line to the intakes of said compressors in parallel, ducts for conducting compressed refrigerant from the discharges of the respective compressors to said condenser, a by-pass duct connected between the discharge of one of said compressors and the intake of another of said compressors, means for preventing return flow of refrigerant from said condenser to the compressor discharge to which said by-pass duct is connected, means for preventing return flow of refrigerant from the compressor intake to which said by-pass duct is connected to said suction line, a valve in said by-pass duct, and means responsive to the refrigerant pressure in said suction line for opening said valve when said pressure is below a predetermined value and closing said valve when said pressure is above said predetermined value.

5. In a refrigerating system, in combination with a refrigerant evaporator, a refrigerant condenser and means for conducting refrigerant from said condenser to said evaporator, a compression unit comprising at least two compressors connected to withdraw evaporated refrigerant from said evaporator and deliver compressed refrigerant to said condenser, means responsive to the refrigerant pressure in said evaporator for starting operation of said compressors when said pressure rises above a first predetermined value and for discontinuing operation of said compressors when said pressure falls below said predetermined value, and further means responsive to the refrigerant pressure in said evaporator for connecting said compressors in series when said pressure is below a second predetermined value higher than said first predetermined value and for connecting said compressors in parallel when said pressure is above said second predetermined value.

6. In a refrigerating system, in combination with a refrigerant evaporator, a refrigerant condenser and means for conducting refrigerant from said condenser to said evaporator, a compression unit comprising two compressors connected to withdraw evaporated refrigerant from said evaporator and deliver compressed refrigerant to said condenser, and means responsive to the difference in pressure between the refrigrant in said evaporator and the refrigerant in said condenser for connecting said compressors in parallel when said pressure difference is below a predetermined value and connecting said compressors in series when said pressure difference is above said predetermined value.

7. In a refrigerating system in combination with a refrigerant evaporator, a refrigerant condenser for condensing refrigerant at substantially constant pressure and means for conducting compressed refrigerant from said condenser to said evaporator, a compression unit comprising two compressors of different volumetric capacity connected to withdraw refrigerant from said evaporator and deliver compressed refrigerant to said condenser, and means responsive to the pressure of the refrigerant withdrawn from said evaporator for connecting said compressors in parallel between said evaporator and said condenser when said pressure is above a predetermined value and for connecting the compressor of larger volumetric capacity to said evaporator and the compressor of smaller volumetric capacity between said larger capacity compressor and said condenser when said pressure is below said predetermined value.

8. In a refrigerating system, in combination with a refrigerant evaporator, a refrigerant condenser and means for conducting refrigerant from said condenser to said evaporator, a compression unit comprising two compressors, each having an intake and a discharge, a suction line for withdrawing evaporated refrigerant from said evaporator, ducts connecting said suction line to the intakes of said compressors in parallel, ducts for conducting compressed refrigerant from the discharges of the respective compressors to said condenser, a by-pass duct connected between the discharge of the first compressor and the intake of the second compressor, means for preventing return flow of refrigerant from said condenser to the discharge of the first compressor, means for preventing return flow of refrigerant from the intake of the second compressor to the intake of the first compressor, a valve in said by-pass duct, and means responsive to the refrigerant pressure in said suction line for opening said valve when said pressure is below a predetermined value and closing said valve when said pressure is above said predetermined value.

9. In a refrigerating system, in combination with a refrigerant evaporator, a refrigerant condenser and means for conducting refrigerant from said condenser to said evaporator, a suction line for withdrawing evaporated refrigerant from said evaporator, a compression unit comprising three compressors connected to withdraw evaporated refrigerant from said suction line and deliver compressed refrigerant to said condenser, and means responsive to the difference in pressure between the refrigerant in said suction line and the refrigerant in said condenser for connecting all of said compressors in parallel when said pressure difference is below a predetermined value, connecting one of said compressors in series with the other two in parallel when said pressure difference rises above said predetermined value, and connecting all of said compressors in series when said pressure difference rises above a higher predetermined value.

10. In a refrigerating system, in combination with a refrigerant evaporator, a refrigerant condenser and means for conducting refrigerant from said condenser to said evaporator, a compression unit comprising three compressors connected to withdraw refrigerant from said evaporator and deliver compressed refrigerant to said condenser, means responsive to the pressure of the refrigerant in said evaporator for connecting all of said compressors in parallel when said pressure is above a first predetermined value and for connecting one of said compressors in series with the other two when said pressure is below said first predetermined value, and further means responsive to the pressure of the refrigerant in said evaporator for connecting all of said compressors in series when said pressure is below a second predetermined value lower than said first predetermined value.

11. In a refrigerating system, in combination with a refrigerant evaporator, a refrigerant condenser and means for conducting refrigerant from said condenser to said evaporator, a suction line for withdrawing evaporated refrigerant from said evaporator, a compression unit comprising a large volumetric capacity compressor, an intermediate volumetric capacity compressor and a small volumetric capacity compressor connected to withdraw evaporated refrigerant from said suction line and deliver compressed refrigerant to said condenser, means responsive to the refrigerant pressure in said suction line for connecting all of said compressors in parallel when said pressure is above a first predetermined value and for connecting said large capacity compressor in series with said intermediate capacity compressor and said small capacity compressor in parallel when said pressure is below said first predetermined value, and further means responsive to the refrigerant pressure in said suction line for connecting said compressors in series in the order of their volumetric capacities when said pressure falls below a second predetermined value lower than said first predetermined value.

12. In a refrigerating system, in combination with a refrigerant evaporator, a refrigerant condenser and means for conducting refrigerant from said condenser to said evaporator, a suction line for withdrawing evaporated refrigerant from said evaporator, a compression unit comprising three compressors each having an intake and a discharge, ducts connecting the intakes of all of said compressors to said suction line, ducts connecting the discharges of all of said compressors to said condenser, a first by-pass duct connecting the discharge of the first of said compressors to the intake of the second of said compressors, a second by-pass duct connecting the discharge of the second of said compressors to the intake of the third of said compressors, a valve in each of said by-pass ducts, means for preventing return flow of refrigerant from the intakes of said second and third compressors to said suction line, means for preventing return flow of refrigerant from the intake of said third compressor to the intake of said second compressor, means for preventing return flow of refrigerant from said condenser to the discharges of said first and said second compressors, means responsive to the refrigerant pressure in said suction line for opening the valve in said first by-pass duct when the refrigerant pressure is below a first predetermined value and closing said valve when the refrigerant pressure is above said first predetermined value, and further means responsive to the refrigerant pressure in said suction line for closing the valve in said second by-pass duct when said refrigerant pressure is above a second predetermined value lower than said first predetermined value and for opening said valve when said refrigerant pressure is below said second predetermined value.

ERWIN LODWIG.

CERTIFICATE OF CORRECTION.

Patent No. 2,318,318. May 4, 1943.

ERWIN LODWIG.

It is hereby certified that error appears in the printed specification of the above numbered patent requiring correction as follows: Page 2, first column, line 60, for "nected" read --connected--; and that the said Letters Patent should be read with this correction therein that the same may conform to the record of the case in the Patent Office.

Signed and sealed this 8th day of June, A. D. 1943.

(Seal)

Henry Van Arsdale,
Acting Commissioner of Patents.